July 21, 1970     B. D. MILLER ET AL     3,521,483

POLE TESTING APPARATUS

Original Filed July 23, 1964     2 Sheets-Sheet 1

INVENTORS
BENJAMIN D. MILLER
RICHARD A. POPECK
FRANK L. TAYLOR
BY *Whittemore, Hulbert & Belknap* ATTORNEYS INVENTORS
BENJAMIN D. MILLER
RICHARD A. POPECK
FRANK L. TAYLOR
BY Whittemore, Hulbert & Belknap
ATTORNEYS United States Patent Office 3,521,483
Patented July 21, 1970

3,521,483
POLE TESTING APPARATUS
Benjamin D. Miller, Dearborn, Richard A. Popeck, Detroit, and Frank L. Taylor, Franklin, Mich., assignors to The Detroit Edison Company, Detroit, Mich., a corporation of New York
Continuation of application Ser. No. 384,672, July 23, 1964. This application Feb. 28, 1968, Ser. No. 709,143
Int. Cl. G01n 29/04
U.S. Cl. 73—67.5                                    9 Claims

ABSTRACT OF THE DISCLOSURE

The method of pole testing includes simultaneously initiating an electric signal and a radially progressing shock wave at one side of a pole to be tested for defects, initiating a second electric signal in response to arrival of the radially progressing shock wave at the opposite side of the pole and comparing the time of initiation of the two signals as an indication of the soundness of the pole.

---

Apparatus for effecting the pole testing method of the invention includes an impact device and a trigger source comprising an electromechanical transducer in the impact device for simultaneously initiating the first electric signal and the shock wave, an electromechanical transducer for initiating the second electric signal in response to the shock wave arriving at the opposite side of the pole and a time interval detector and readout meter for determining the time interval between initiation of the electric signals and providing a display thereof indicative of the soundness of the pole tested.

The invention relates to testing apparatus and refers more specifically to apparatus for testing wood poles for decay.

Ser. No. 384,672, filed July 23, 1964, is a continuation filing date.

In the past testing of wood poles, such as are used by many utilities for supporting electric conductors above ground, have been tested for decy by particularly tedious or inefficient methods.

Thus in the past a hammer test has sometimes been used in which the wood pole is hit sharply with a hammer to produce characteristic sounds which were determinative of the condition of the pole. Such tests however are subject to the errors introduced by individual sense of hearing and subjective analysis. Sound measurement levels and frequency analysis of poles have also been tried but too many variables result in a determination which is not reliable.

Also, measuring of the time difference between initial and reflected ultrasonic waves has been tried in the testing of poles. With such methods however the attenuation has been high and the results are not satisfactory.

It is therefore an object of the present invention to provide improved structure for the non-destructive testing of wood poles for decay.

Another object is to provide structure for the non-destructive testing of wood poles for decay including means for generating an electric signal and a shock wave starting from one side of the pole simultaneously, means for generatinfg a second electric signal on the shock wave reaching the other side of the pole, and means for comparing the relative time of initiation of the two electric signals as an indication of the condition of the pole.

Another object is to provide structure as set forth above wherein the means for producing an electric signal and a shock wave simultaneously comprises a probe including a pressure responsive transducer for generating an electric signal on striking of the probe.

Another object is to provide structure as set forth above wherein the means for generating the second electric signal comprises a second pressure responsive transducer.

Another object is to provide structure as set forth above wherein the means for determining the time between the initiation of the two electric signals comprises an electronic circuit responsive to the first electric signal to start a time interval and responsive to the second electric signal to end the time interval.

Another object is to provide structure as set forth above wherein the electronic circuit includes means for calibration and for maintaining a reading representative of the time interval thereon for an indefinite period.

Another object is to provide an apparatus for testing wood poles for decay comprising means for generating an electric signal and striking the wood pole on one side simultaneously to create a shock wave in the wood pole, developing a second electric signal in response to a shock wave received at the opposite side of the pole and comparing the time between the initiation of the two electric signals as a measurement of the condition of the pole.

Another object is to provide apparatus for testing wood poles for decay which is simple, economical and efficient.

Other objects and features of the invention will become apparent as the description proceeds, especially when taken in conjunction with the accompanying drawings, illustrating a preferred embodiment of the invention, wherein.

With particular reference to the figures of the drawings, one embodiment of the apparatus for testing for decay in wood poles will now be considered in detail.

Figure 1:
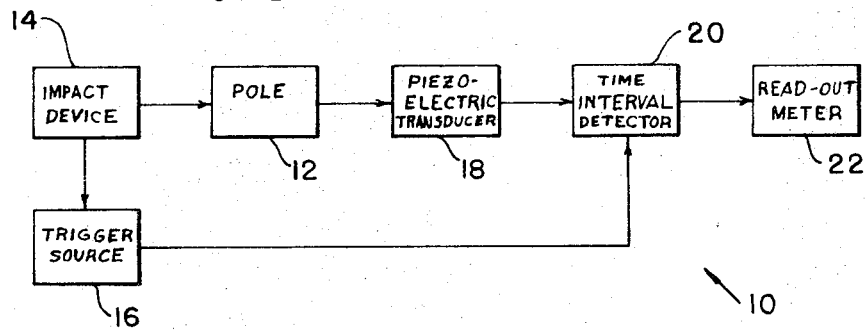
FIG. 1 is a block diagram of the apparatus for testing wood poles for decay in accordance with the invention.

As shown in FIG. 1, the apparatus 10 for testing for decay in wood poles 12 includes an impact device 14, a trigger source 16, a piezoelectric transducer 18, a time interval detector 20, and a read-out meter 22. The impact device 14 and piezoelectric transducer 18 are positioned on opposite sides of the pole 12.

In operation the impact device 14 is caused to generate a shock wave through pole 12 to produce an electric signal in piezoelectric transducer 18 which is fed to the time interval detector 20. The impact device 14 also initiates an electric signal from trigger source 16 simultaneously with the production of the shock wave in pole 12. The electric signal from trigger source 16 is fed to the time interval detector 20. The relative time of initiation of the two electric signals is determined by the time interval detector 20 and the read-out meter 22 provides an indication of the time difference therebetween as an indication of the condition of the wood pole 12.

Figure 4:
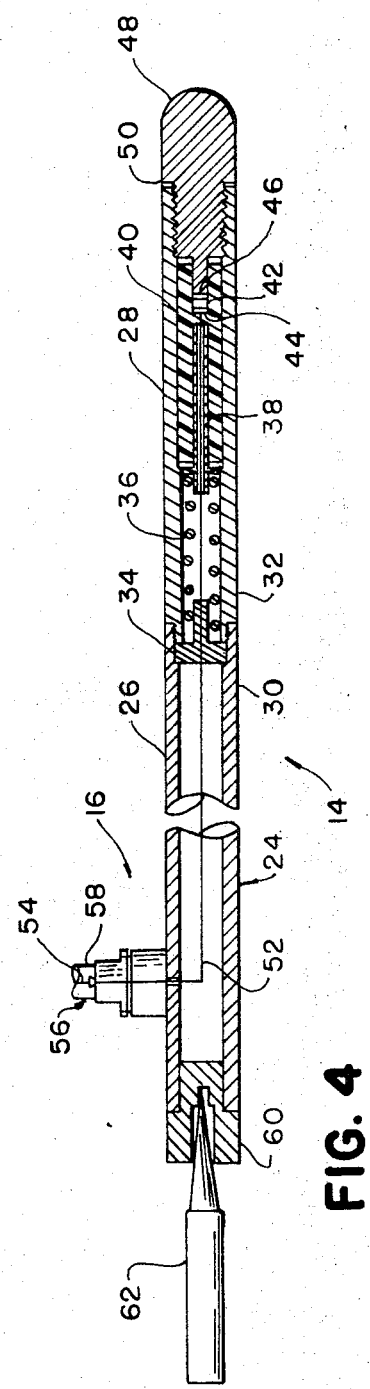
FIG. 4 is an enlarged longitudinal section view of the impact device and trigger source of the apparatus for testing wood poles for decay as illustrated in FIG. 1.

More specifically the impact device 14, as shown best in FIG. 4, is an elongated probe 24 including the hollow cylindrical outer case members 26 and 28 which are threadedly connected at ends 30 and 32, respectively, and include therebetween the retaining member 34 for biasing spring 36. The slug of cold rolled steel 38 extends axially through the cylindrical member 28 and is insulated therefrom by the insulating sleeve 40 which may be of Bakelite or similar material.

A piezoelectric crystal 42 is carried by the Bakelite insulator between a pair of copper discs 44 and 46, as best shown in FIG. 4. The copper disc 46 is electrically connected to a stainless steel tip 48 on the probe 24 which tip is separated from the cylindrical body member 28 of the probe 24 by means of a copper washer 50. The other copper disc 44 is connected by electric conductor 52 to the center cable 54 of a coaxial conductor 56. The outer cable 58 of the coaxial conductor 56 is connected to the copper disc 46 through the tip 48 and cylindrical members 28 and 26. An appropriate connecter for the coaxial cable to cylinder member 26 and conductor 52 is provided.

A cap 60 is provided on the end of the probe 24 opposite the stainless steel tip 48. Cap 60 may be struck by appropriate means such as center punch 62 in testing.

Figure 2:
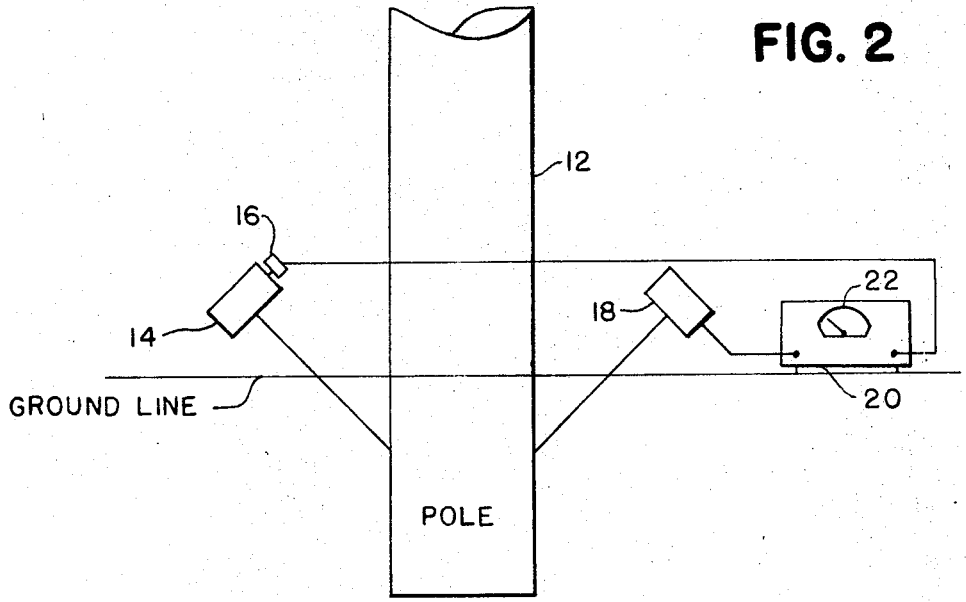
FIG. 2 is a diagrammatic representation of the apparatus for testing wood poles for decay in accordance with the invention.

In operation the tip 48 of the probe 24 is placed against one side of a wood pole 12, as illustrated in FIG. 2, and the cap 60 is struck by convenient means such as center punch 62 to produce a shock wave at sonic frequency along the probe 24 which is transferred into the pole 12. The shock wave through probe 24 will produce an electric signal from the pressure responsive piezoelectric transducer crystal 42 on the coaxial cable 56. Thus on striking the probe 24 a time base electric reference or trigger signal is produced simultaneously with production of a shock wave at one side of the pole 12. Phobe 24 thus functions as both an impact device 14 and trigger source 16.

Figure 5:
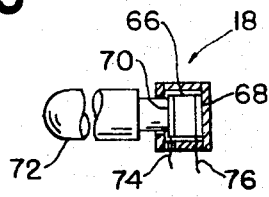
FIG. 5 is an enlarged section view of the piezoelectric transducer of the apparatus for testing wood poles for decay as illustrated in FIG. 1.

The piezoelectric transducer 18, as illustrated in FIG. 5, includes the housing 64 for a piezoelectric crystal transducer 66, the copper discs 68 and 70 positioned on opposite sides thereof and the sensing tip 72 connected to the copper disc 70. Electric conductors 74 and 76 are secured to copper discs 68 and 70 respectively. Convenient means (not shown) may be provided to secure the piezoelectric transducer 18 to the opposite side of the pole 12 from probe 24 as shown in FIG. 2. Alternatively, the piezoelectric transducer 18 may be manually held in contact with the pole 12.

In operation when the shock wave produced by probe 24 reaches the side of the pole 12 opposite the probe 24, the sensing tip 72 will vary the pressure on the piezoelectric crystal 66 to produce an electric signal over conductors 74 and 76.

The electric signal from the piezoelectric transducer 18 over conductors 74 and 76 is presented at terminals 82 and 84 of the time interval detector 20 at some time later than the time at which the electric signal from coaxial cable 56 is fed thereto at terminals 78 and 80. The time difference of arrival of the electric signal at the time interval detector 20 is determined by the condition of the pole 12 and the time for the shock wave to pass therethrough.

Figure 3:
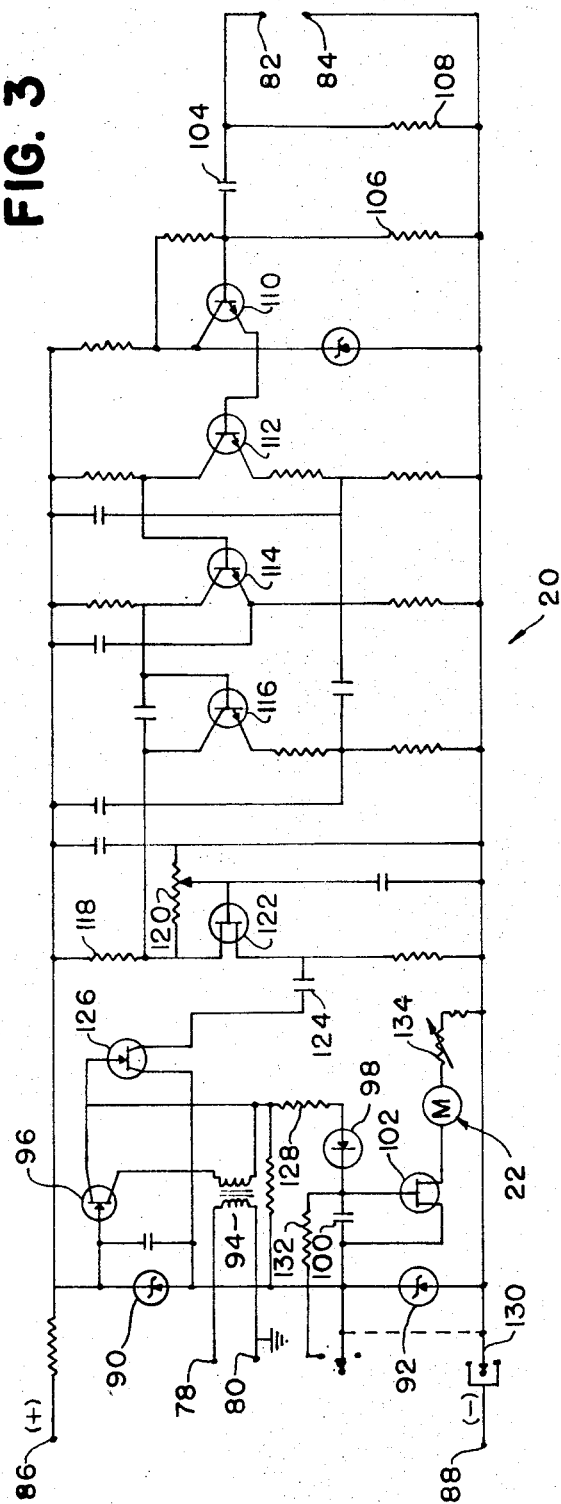
FIG. 3 is a schematic diagram of the time interval detector and read-out meter of the apparatus for testing wood poles for decay as illustrated in FIG. 1.

The time detector 20 and the read-out meter 22 will be considered in conjunction with the schematic diagram thereof illustrated in FIG. 3 and the over-all operation of the testing apparatus 10. With reference to FIG. 3 a regulated voltage of, for example thirty volts is applied across terminals 86 and 88 which voltage is divided across the Zener diodes 90 and 92.

On receipt of an electric signal from probe 24 over coaxial conductor 56 at terminals 78 and 80 a signal is provided through transformer 94 to cause the silicon controlled rectifier 96 to conduct through diode 98 and capacitor 100. The charging of capacitor 100 will limit the flow of current through the field effect transistor 102 which previously has been conducting a predetermined current, for example five milliamperes, through the read-out meter 22. The amount by which the current through meter 22 is limited by charging of capacitor 100 is dependent on the length of time that the silicon controlled rectifier 96 conducts.

On the shock wave produced by probe 24 reaching the side of the pole 12 opposite the probe 24, the piezoelectric transducer 18 will produce a small alternating electric signal at terminals 82 and 84 of the time interval detector 20, as previously indicated. This signal is filtered through a filter network including capacitor 104 and resistors 106 and 108. The filtered signal is then amplified through a four stage amplifier including transistor amplifier circuits 110, 112, 114 and 116. The amplified signal through transistor 116 will provide a signal between the resistors 118 and 120 which will cause the fast switching unijunction transistor 122 to conduct.

On conduction of transistor 122 the charge on capacitor 124 which has been building up during the conducting time of the silicon controlled rectifier 96 is discharged, exciting the silicon controlled rectifier 126 to a conducting state and shorting out the conduction through the resistor 128 and the consequent charging of the capacitor 100. The charge on the capacitor 100 will at this time remain substantially constant since the rectifier 98 prevents a discharge flow of current therefrom.

The current flowing through the field effect transistor 102 will thus be stabilized at some current lower than the calibrating current which lower current will be representative of the time difference between the reception of a signal over conductors 78 and 80 due to the initiation of a shock wave in the pole 12 which started the capacitor 100 charging and the reception of a signal from piezoelectric transducer 18 initiated due to the arriving of the shock wave at an opposite surface of the pole 12 to stop the charging of the capacitor 100.

The reading of the read-out meter 22 will thus indicate a drop in current therethrough representative of the difference in the time of arrival of the two electric signals at the time interval detector which will be an accurate indication of the condition of the pole 12. The exact reduction of current through the meter 22 will of course depend on the condition of the pole. Also, the reading of the meter 22 must be compensated for the thickness of the pole and the type of pole.

The meter 22 may first be reset and calibrated to produce a predetermined meter reading on movement of the switch 130 in an up position to provide a ground connection through the Zener diode 92 and to connect the resistance 132 to the field effect transistor 102, thus placing the meter in circuit with the adjustable resistance 134, field effect transistor 102 and its biasing resistor 132 and in parallel with the Zener diode 92.

Switch 130 further provides a center or holding position in which the Zener diode 92 and meter 22 are not grounded so that the capacitor 100 is not discharged. In effect this provides a holding position for the meter reading which may be made when the switch 130 is in a down position in FIG. 3. With switch 130 in the down position the reading of meter 22 will deteriorate slowly as the capacitor 100 discharges through transistor 102.

While one embodiment of the present invention has been considered in detail, it will be understood that other modifications and embodiments thereof are contemplated. For example the probe 24 and piezoelectric transducer 18 may be constructed with probe members which can be driven into the ground at opposite sides of a buried portion of a pole whereby the condition of the buried portion of the pole may be determined as indicated in FIG. 2. It is therefore the intention to include all modifications and embodiments of the invention as are defined by the appended claims within the scope of the invention.

What we claim as our invention is:

1. Apparatus for testing a wood pole or the like for decay comprising means for generating a trigger signal and a shock wave at one side of the pole simultaneously, means positioned at the other side of the pole for developing a second signal on the shock wave reaching the other side of the pole and time interval detector means connected to the signal generating and signal developing means for comparing the time of initiating of the signals as a measure of the soundness of the wood pole which time interval detector comprises an electronic circuit having a calibrated meter and a capacitor therein, means for charging the capacitor in response to the reception of the trigger signal by the time interval detector for reducing the current flow through the meter and means for stopping the charging of the capacitor and thus stopping the reduction of current flow through the meter on the time interval detector receiving a signal from the signal developing means positioned on the other side of the pole which means for stopping the charging of the capacitor on reception of a signal from the signal developing means comprises a second capacitor, a uni-junction transistor operable on sensing the signal from the signal developing means to conduct and produce discharging of said second capacitor and a silicon controlled rectifier for shorting out the charging circuit of the first capacitor on discharge of said second capacitor.

2. Structure as set forth in claim 1 wherein the means for charging the capacitor and reducing the current flow through the meter in response to reception of a trigger signal comprises a field effect transistor connected in series with the meter including the capacitor in the bias circuit thereof.

3. Apparatus for testing wood poles or the like for decay comprising a probe for positioning against one side of the wood pole, including an elongated hollow tube having an abutment for imparting a shock wave to the pole secured to one end thereof and means to facilitate striking of the probe at the other end thereof, a piezoelectric crystal positioned in contact with the abutment adjacent the one end of the tube, resilient means within the tube urging the piezoelectric crystal into contact with the abutment and means for removing an electric signal created by the piezoelectric crystal on striking of the probe whereby a shock wave and a first electric signal may be generated simultaneously at one side of the pole on striking of the probe, a transducer positioned on the other side of the pole for receiving the shock wave after it has passed through the pole and for developing a second electric signal in response thereto and time interval detector means connected to receive the two electric signals including means for comparing the time of initiation of the signals as a measure of the soundness of the wood pole.

4. Apparatus for testing wood poles or the like for decay comprising a probe for positioning against one side of the wood pole, means within the probe for simultaneously generating a shock wave and a first electric signal at one side of the pole on striking of the probe, a transducer positioned on the other side of the pole for receiving the shock wave after it has passed through the pole and for developing a second electric signal in response thereto and time interval detector means connected to receive the two electric signals for comparing the time of initiation of the signals as a measure of the soundness of the wood pole including a meter in series with a field effect transistor across a regulated power source and a capacitor in the bias circuit of the transistor effected to vary the signal through the meter in accordance with the charge thereon, means for initiating charging of the capacitor on receipt of the initial electric signal at the time interval detector and means for stopping charging of the capacitor on receipt of the second electric signal at the time interval detector operably associated with the capacitor.

5. Structure as set forth in claim 4 wherein the means for initiating charging of the capacitor comprises a silicon controlled rectifier, a transformer secondary winding and a diode in series in a charging circuit for the capacitor and a transformer primary winding operably associated with the secondary winding connected to receive the first electric signal.

6. Structure as set forth in claim 5 wherein the means for stopping the charging of the capacitor comprises a second capacitor, a second silicon controlled rectifier connected to the first silicon controlled rectifier and to the second capacitor in a circuit for shorting the first silicon controlled rectifier to prevent charging of the first capacitor on discharging of the second capacitor and a uni-junction transistor connected to the second capacitor and operable in response to the second electric signal to discharge the second capacitor.

7. A probe comprising an elongated hollow tube having an abutment for imparting a shock wave to a wood pole secured to one end thereof and means to facilitate striking of the probe at the other end thereof, a piezoelectric crystal positioned in contact with the abutment adjacent the one end of the tube, resilient means within the tube urging the piezoelectric crystal into contact with the abutment and means for removing an electric signal created by the piezoelectric crystal on striking of the probe.

8. Apparatus for testing wood poles or the like for decay, comprising a probe for positioning against one side of the wood pole, means within the probe for simultaneously generating a radially progressing shock wave, and a first electric signal at one side of the pole on striking of the probe, a transducer positioned on the other side of the pole for receiving the radially progressing shock wave after it has passed through the pole and for developing a second electric signal in response thereto, and time interval detector means connected to receive the two electric signals for comparing the time of initiation of the two electric signals as a measure of the soundness of the wood pole, including a meter in series with a field effect transistor across a regulated power source, and means in the bias circuit of the transistor for varying the signal through the meter in accordance with the time of the initiation of the signals.

9. Structure as set forth in claim 8, wherein the means in the bias circuit of the transistor for varying the signal through the meter is a capacitor in the bias circuit operable to vary the signal through the meter in accordance with the charge on the capacitor and further including means within the means for comparing the time of initiation of the signals for initiating charging of the capacitor on receipt of the initial electric signal at the time interval detector and means for stopping charging of the capacitor on receipt of the second electric signal at the time interval detector.

References Cited

UNITED STATES PATENTS

| | | | |
|---|---|---|---|
| 2,601,779 | 7/1952 | Firestone | 73—67.8 |
| 2,933,681 | 4/1960 | Crain. | |
| 3,066,525 | 12/1962 | Harris | 73—67.5 XR |

FOREIGN PATENTS

| | | |
|---|---|---|
| 494,971 | 8/1953 | Canada. |
| 403,109 | 11/1945 | Italy. |

OTHER REFERENCES

An article from "Mesures," June 1955, entitled "Acoustique et Vibrations," pp. 427–9.

JAMES J. GILL, Primary Examiner